Feb. 17, 1931.  J. F. RULE  1,792,932
GLASS FEEDING APPARATUS
Filed Oct. 17, 1927  3 Sheets-Sheet 3
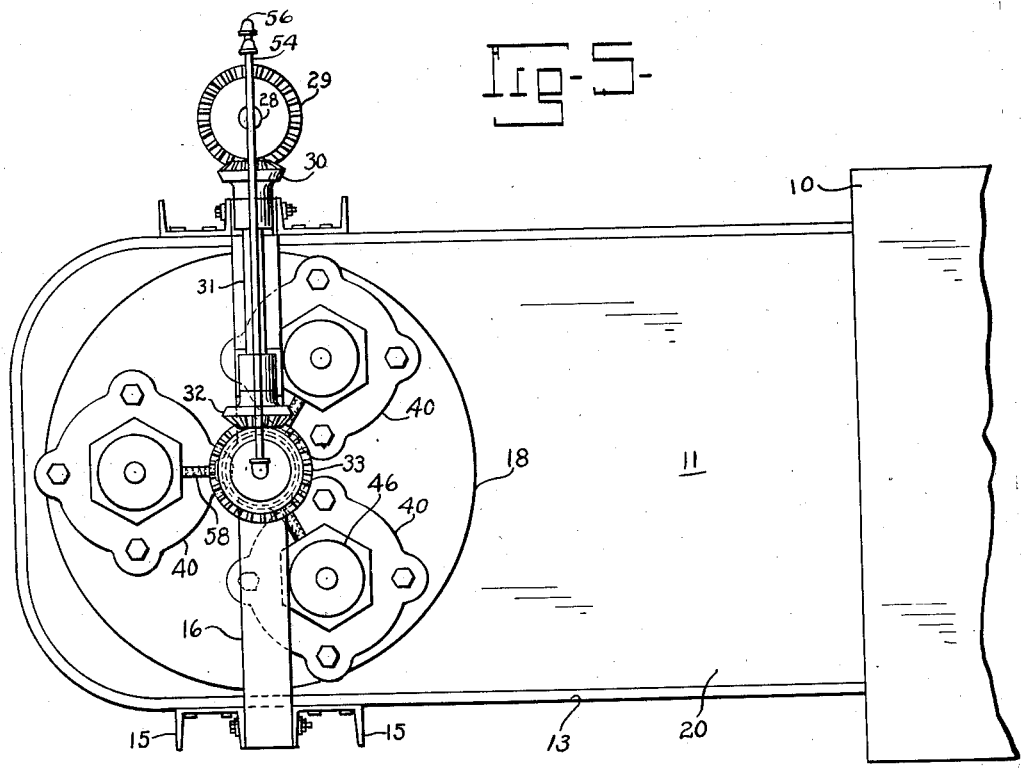
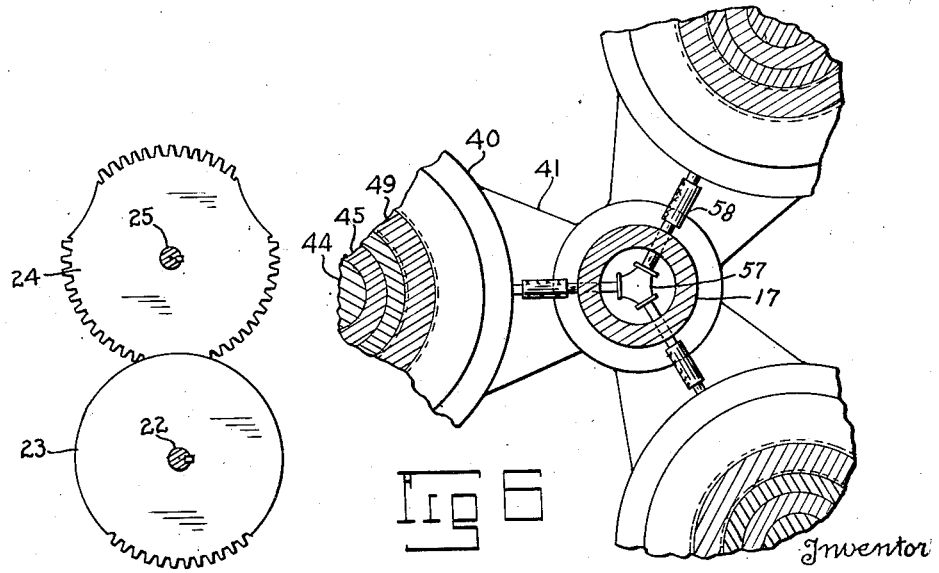
Inventor
John F. Rule Patented Feb. 17, 1931

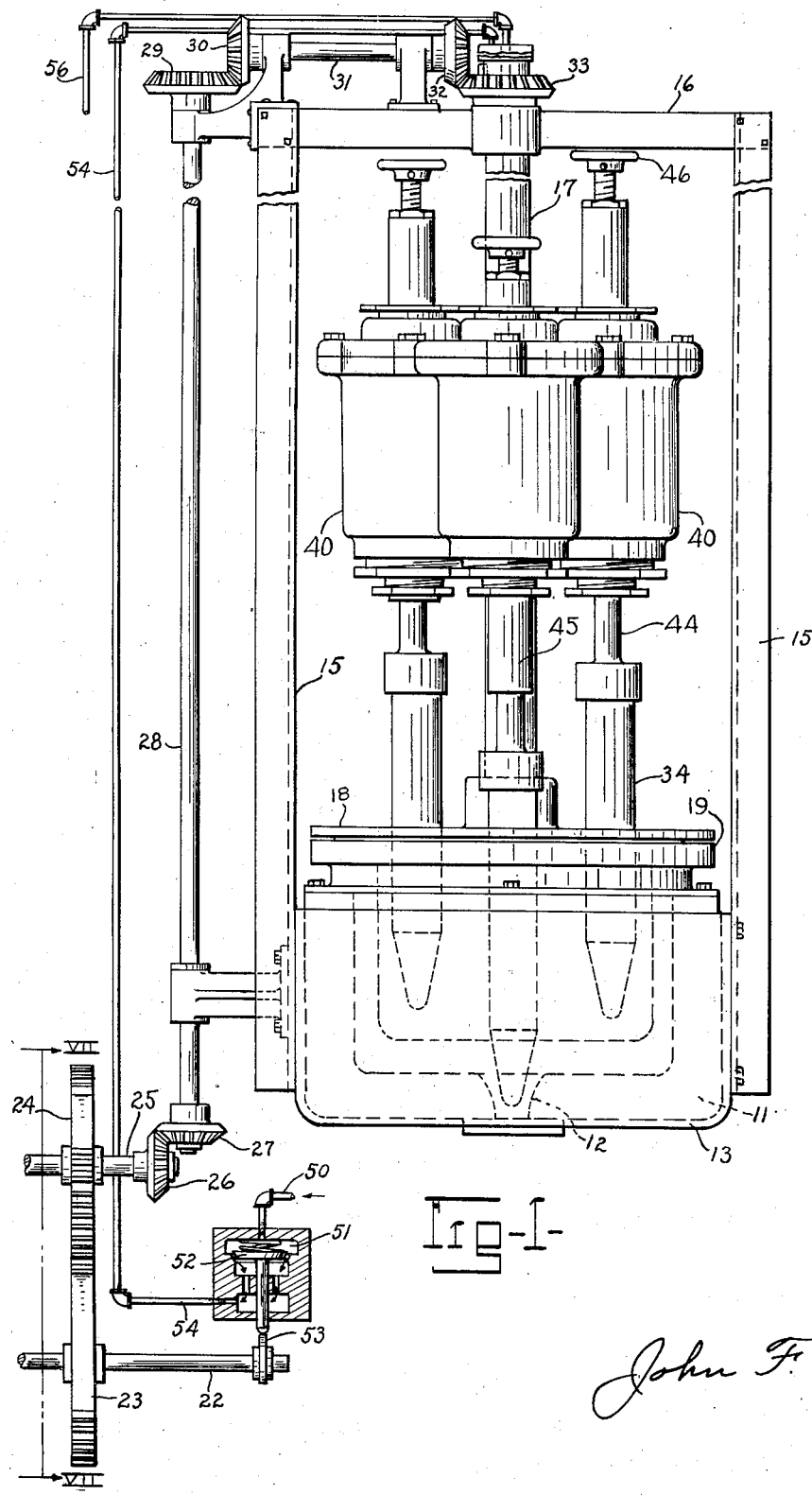

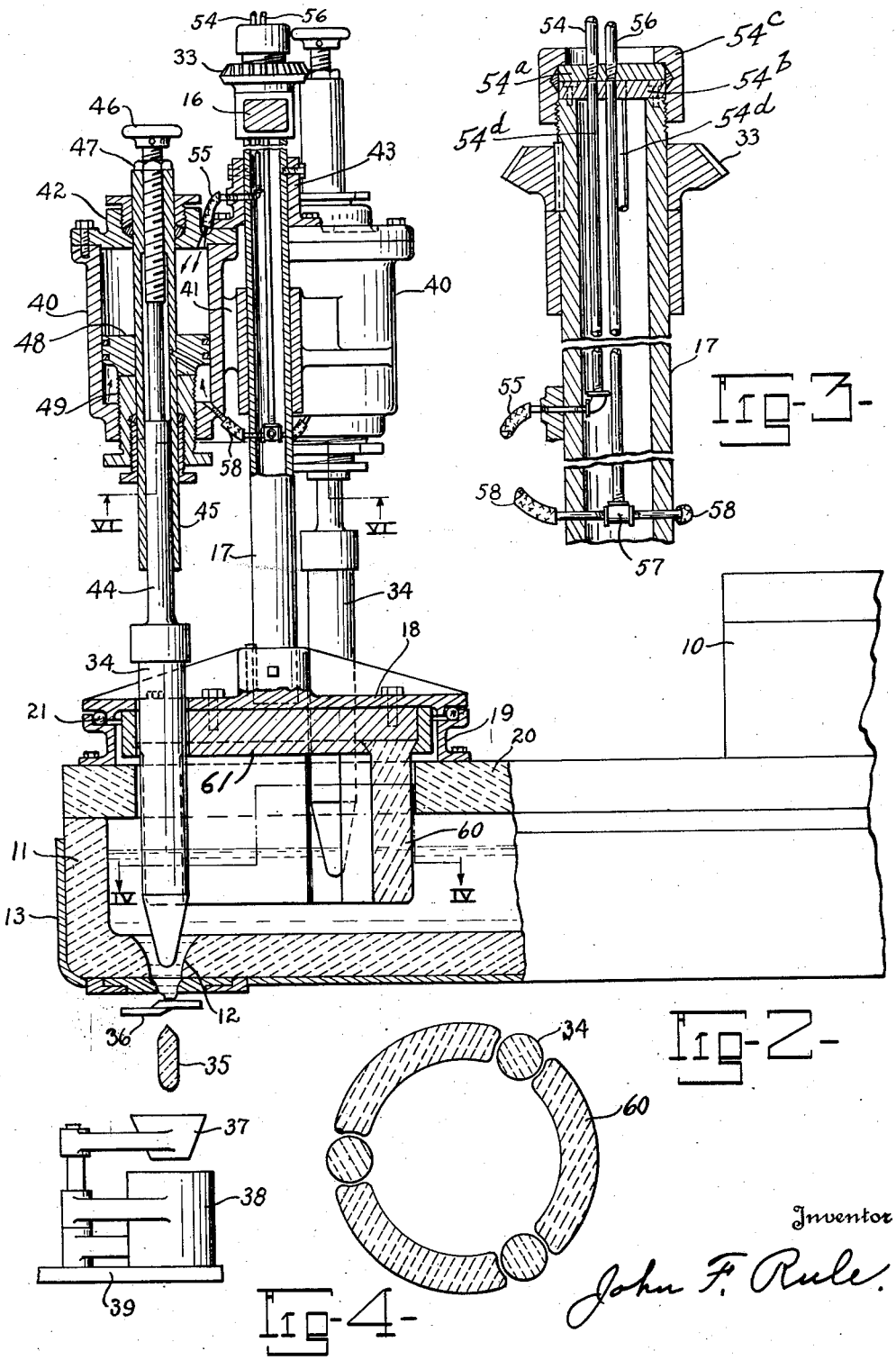

1,792,932

UNITED STATES PATENT OFFICE

JOHN F. RULE, OF TOLEDO, OHIO, ASSIGNOR TO OWENS-ILLINOIS GLASS COMPANY, OF TOLEDO, OHIO, A CORPORATION OF OHIO

GLASS-FEEDING APPARATUS

Application filed October 17, 1927. Serial No. 226,572.

My invention relates to apparatus for feeding and segregating from a supply body of molten glass, individual charges of glass suitable for the molds of forming machines. More particularly, it relates to mechanism for forming and delivering mold charges in succession and for periodically varying the size of the charges to correspond to the capacities of different sized molds to which the charges are delivered.

An object of the invention is to provide a practical construction embodying a container for a supply body of glass having a discharge outlet, a plurality of plungers arranged to be brought in succession to an operative position over the outlet, and means for reciprocating the plungers over the outlet. Each plunger is separately adjustable and operable independently of the others, so that each plunger controls the formation and delivery of charges of a certain size independently of the charges controlled by the other plungers.

Other objects of the invention will appear hereinafter.

Referring to the accompanying drawings, which illustrate a construction embodying one form of the invention:

Fig. 1 is a front elevation view of the apparatus.

Fig. 2 is a part sectional side elevation of the same.

Fig. 3 is a sectional view on a larger scale showing the upper portion of the central column.

Fig. 4 is a section at the line IV—IV on Fig. 2, showing the reciprocating plungers and rotating tube.

Fig. 5 is a top plan view of the apparatus.

Fig. 6 is a fragmentary sectional view taken at the line VI—VI on Fig. 2.

Fig. 7 is a view taken at the plane of the line VII—VII on Fig. 1.

The apparatus is shown in connection with a glass furnace 10 provided with an extension or forehearth 11 having a bottom outlet 12 through which molten glass is discharged. The feeder mechanism is carried in a framework attached to the usual metal casing 13 which supports the forehearth 11, said framework comprising vertical frame members 15 and a transverse top bar 16. A central vertical shaft 17 is journalled for rotation in the frame member 16. Keyed to the lower end of the shaft 17 is a plate 18 supported on a bearing ring 19 mounted on the cover block 20 of the forehearth. The ring 19 is formed with a raceway to receive bearing balls 21. The shaft 17 is intermittently rotated by a continuously rotating drive shaft 22 (Fig. 1) operating through intermediate gearing comprising mutilated gears 23 and 24 mounted, respectively, on the drive shaft 22 and a shaft 25. A bevel gear 26 on the shaft 25 meshes with a bevel gear 27 on the lower end of a vertical shaft 28 which carries at its upper end a bevel gear 29 running in mesh with a gear 30 on a horizontal shaft 31 which also carries a bevel gear 32 running in mesh with a gear 33 keyed to the shaft 17.

By reference to Fig. 7, it will be seen that the mutilated gears 23 and 24 are so formed that each complete rotation of the gear 23 will impart to the gear 24 a rotation through 120 degrees. This movement of the gear 24 is transmitted through the intermediate gears to the central shaft 17 and imparts thereto a rotation through 120 degrees. It will also be noted that the gear 24 between successive movements is locked by the gear 23 and held stationary during a substantially longer period than that during which it rotates. The length of these rest periods may evidently be increased or decreased by a corresponding increase or decrease in the diameter of the gear 23.

The intermittent rotation of the shaft 17 serves to bring a series of plungers 34 successively over the outlet 12. Each plunger when over the outlet is given a vertical reciprocation by means presently to be described, while the other plungers remain at rest in their elevated positions. Each reciprocation of the plunger operates in a well understood manner to control the discharge of a mass or charge 35 of glass, the downward movement of the plunger exerting an expelling force on the glass, and its upward movement a retarding force. A pair of shears 36 operate periodically in synchronism with the movements of the plunger 34 to sever the suspended charges 35 and permit them to drop through funnel guides 37 into molds 38 of a forming machine. The molds may be mounted, for example, on a rotating mold carriage 39.

The plungers are reciprocated by means of air operated motors which are carried by the shaft 17 and rotate therewith. These motors comprise cylinders 40 which may be cast integral with a central web or spider 41 having a bearing sleeve fitting on the shaft 17. The heads 42 of the cylinders are bolted to a sleeve or bracket 43 fixed to the shaft 17.

Each plunger 34 is connected to a stem 44 which extends upwardly through a hollow shaft or sleeve 45, the upper end of said stem having a threaded connection with the sleeve for vertical adjustment therein. A hand wheel 46 is provided on the upper end of the stem for rotating the latter to adjust it up or down in the sleeve. A lock nut 47 holds the stem in its adjusted position. A motor piston 48 is keyed to the shaft 45. The downward movement of the piston is limited by the cylinder head 49 which is in the form of a sleeve that surrounds the shaft 45 and has a screw threaded connection with the lower end of the motor cylinder. This construction permits vertical adjustment of the head 49 which gives a corresponding adjustment of the lowermost position of the plunger.

The air system for operating the piston motors will now be described: Air for lowering the motor pistons is supplied through a pipe 50 (Fig. 1) connected to a source of constant air pressure. The pipe 50 communicates with a valve chamber 51 in which is a valve 52 actuated by a cam 53 on the drive shaft 22. When the valve 52 is lifted, air under pressure is admitted to the pipe line 54 which extends to the top of the central shaft 17 (see Fig. 3). The end of the pipe 54 is threaded into a stationary bearing plate or disk 54ª which overlies an end plate 54ᵇ bolted to the upper end of the shaft 17 to rotate therewith. A cap 54ᶜ fits over the plates 54ª and 54ᵇ and holds said plates in operative relation, the cap being threaded onto the shaft 17. Branch pipes 54ᵈ within the shaft 17 are connected at their upper ends to the plate 54ᵇ, said pipes being so positioned and arranged that each step rotation of the shaft 17 brings one of said pipes into alignment with the pipe 54. The lower ends of the pipes 54ᵈ are connected to branch lines 55 which lead to and through the heads 42 of the respective cylinders for supplying air above the pistons. The cam 53 (Fig. 1) is timed to open the valve 52 when a plunger 34 has been rotated to a position over the outlet and brought to rest, at which time the corresponding branch pipe 54ᵈ is in register with the pipe 54. Air pressure is thus supplied above the plunger which is thereby moved downward to expel a charge of glass. After the plunger has moved downward, the valve 52 closes, cutting off the air supply above the piston.

The piston is lifted by air pressure supplied through a line 56 in constant communication with a source of air pressure. The line 56 extends downward through the center of the hollow shaft 17 to a three-way connection 57 and thence through branch pipes 58 which lead to ports in the lower end of the cylinders 40, thereby supplying air pressure beneath the pistons 48 for lifting the plungers. A higher pressure is preferably supplied through the pipe line leading to the upper ends of the motor cylinders, than that supplied below the pistons, so that each piston can be moved downward against the lifting pressure of the air thereneath.

Interposed between the plungers 34 are shields 60 made of clay or other refractory material. The shields extend downward into the glass and rotate with the plungers about the axis of the central shaft 17. These shields 60 may all be made in one piece in the form of a cylinder or drum, or they may be made in separate sections. As herein shown, they are supported on a circular plate 61 carried by the plate 18. The shields 60 serve to protect the plungers 34 and relieve them from the lateral strain to which they would otherwise be subjected while moving horizontally through the viscous glass. The rotation of the shields 60 together with the plungers also serves as an effective means for circulating the glass, preventing stagnation, eliminating cold streaks and maintaining homogeneity and uniform temperature conditions of the glass issuing from the outlet.

The operation will be understood from the foregoing description, but may be briefly stated as follows:

The continuously rotating drive shaft 22 (Fig. 1) operates through the mutilated gears 23, 24 connected through intermediate gearing to the central shaft 17, to rotate the latter step by step, thereby bringing the plungers 34 successively to an operating position over the outlet 12 as the shaft 17 comes to rest. The plunger which is in operative position is then given one complete vertical reciprocation, first, downward to expel the glass, and then upward to retard it, after which the shears 36 operate to sever the charge. As the size of each charge is controlled by a single plunger independently of the others, three different sizes of charges may be delivered in succession, adapted for forming articles of correspondingly different sizes. These different sized articles may be made on different machines to which the charges of glass are fed in succession, or molds for making the different sized articles may be carried on the same machine, being arranged so that the formation of charges for each mold will all be under the control of the same plunger.

The size and shape of the charges under the control of each plunger may be adjustably varied and controlled in a large measure by adjusting the position or range of movement of the plunger. For example, the plunger may be adjusted in an upward direction by means of the hand wheel 46 to permit a freer flow of glass, resulting in larger charges, or the plunger may be adjusted downward to cause a more restricted flow by which the size of the charges is reduced. Such adjustment does not change the length of the plunger stroke. The stroke may be lengthened or shortened by a downward or upward adjustment of the cylinder head 49, without changing the upper limit of movement of the plunger. If it is desired to adjustably lengthen the plunger stroke without changing its lowermost position, the head 49 may be adjusted downward and the plunger adjusted upward a corresponding distance by means of the hand wheel 46. It will be seen that the adjusting means provides for shortening or lengthening the stroke of the plunger, adjusting both the upper and lower limits of its movement either up or down, or making any combination of such adjustments within predetermined limits, permitting the size and shape of the charges controlled thereby to be adjusted to suit the size and shape of the mold or molds receiving such charges, independently of the other plungers.

Although I have shown a machine comprising three units, each comprising a plunger, its piston motor and associated mechanism, it will be understood that the number may be increased or decreased. The plungers may all be of one size, the variations in the size of the charges being controlled by the relative adjustments of the several plungers, that is, the adjustments of their upper and lower limits of movement. If desired, the size or shape of each plunger may be different from that of the other plungers, resulting in a corresponding difference in the size and shape of the charges controlled thereby.

Various modifications may be resorted to within the spirit and scope of my invention.

What I claim is:

1. Apparatus for delivering charges of molten glass comprising a container for the glass having a bottom outlet, a plurality of implements, means for bringing them in succession into operative position over the outlet, and motors individual to said implements and operable to actuate each said implement when in said position to regulate the discharge of a charge of glass.

2. Apparatus for delivering charges of molten glass in succession comprising a container for the glass having a bottom outlet, a plurality of implements, automatic means for bringing them in succession into operative position over the outlet, and mechanism for operating said implements in succession to control the formation of the charges of glass and cause the formation of each successive mold charge to be controlled by a different implement than the next preceding mold charge, said mechanism including means to reciprocate each implement vertically when in said position without vertical movement of the other said implements.

3. Apparatus for delivering charges of molten glass in succession comprising a container for the glass having a bottom outlet, a plurality of implements, automatic means for bringing them in succession into operative position over the outlet, mechanism for operating said implements in succession to control the formation of the charges of glass and cause the formation of each successive mold charge to be controlled by a different implement than that controlling the next preceding charge, said mechanism including means to actuate each said implement when in said position to regulate the discharge of a charge of glass while the other said implements are held stationary, and manual adjusting means by which the movement of each implement may be varied independently of the others.

4. Apparatus for delivering charges of molten glass in succession comprising a container for the glass having a bottom outlet, a plurality of implements, automatic means for bringing them in succession into operative position over the outlet, mechanism for operating said implements in succession to control the formation of the charges of glass and cause the formation of each successive mold charge to be controlled by a different implement than that controlling the next preceding charge, said mechanism including means to reciprocate each implement vertically when in said position without vertical movement of the other said implements, and manual adjusting means by which the movement of each implement may be varied independently of the others.

5. Apparatus for delivering charges of molten glass comprising a container for the glass having a bottom outlet, a plurality of implements, means for bringing them in succession into operative position over the outlet, and means to actuate each said implement independently of the other implements when in said position to regulate the discharge of a charge of glass, said implements operating in succession and causing the formation of each successive mold charge to be controlled by a different implement than that controlling the next preceding charge, said implements being so arranged that they will cause unequal volumes of glass to be discharged, whereby the volumes of the charges will vary periodically in a predetermined order.

6. Glass feeding apparatus comprising, in combination, a container for molten glass having a submerged outlet, plungers projecting into the glass, means to bring said plungers in succession to a position over the outlet for successively controlling the formation of successive mold charges, and means to move said plungers up and down singly in succession and thereby cause the formation of each successive mold charge to be controlled by a different plunger than that controlling the next preceding charge, each plunger being moved up and down when in said position over the outlet.

7. Glass feeding apparatus comprising in combination, a container for molten glass having a submerged outlet, plungers projecting into the glass, means to bring said plungers in succession to a position over the outlet for successively controlling the formation of successive mold charges, means to move said plungers up and down singly in succession and thereby cause the formation of each successive mold charge to be controlled by a different plunger than that controlling the next preceding charge, each plunger being moved up and down when in said position over the outlet, and adjusting means individual to the plungers for adjusting the plungers vertically.

8. Glass feeding apparatus comprising, in combination, a container for molten glass having a submerged outlet, plungers projecting into the glass, means to bring said plungers in succession to a position over the outlet, means to reciprocate each plunger up and down when in said position and thereby cause it to control the formation of a mold charge, the formation of each mold charge being controlled by a different plunger than that controlling the formation of the next preceding charge, and adjusting means individual to the plungers, the adjusting means for each plunger including means for separately adjusting the upper and lower limits of movement respectively of the plunger.

9. Glass feeding apparatus comprising, in combination, a container for molten glass having a submerged outlet, plungers projecting into the glass, a carrier for the plungers, means to rotate the carrier about a vertical axis and thereby bring the plungers in succession to operative position over the outlet, and means to reciprocate each plunger when in said position without reciprocation of the other plungers and thereby cause the plungers to successively control the formation of the mold charges, the formation of each mold charge being thereby controlled by a different plunger than that controlling the formation of the next preceding charge.

10. Glass feeding apparatus comprising, in combination, a container for molten glass having a submerged outlet, plungers projecting into the glass, a carrier for the plungers, means to actuate the carrier and thereby bring the plungers in succession to operative position over the outlet, and air motors mounted on said carrier and operatively connected to the respective plungers for reciprocating them.

11. In glass feeding apparatus, the combination of a container for molten glass having a submerged outlet, an implement projecting into the glass in the container, automatic means for periodically moving the implement laterally into and out of an operative position over the outlet, a shield extending into the glass at one side of the implement and movable laterally with the implement to thereby relieve the strain on the implement as it moves through the glass, and means for actuating the implement when over the outlet.

12. The combination of a container for molten glass having a submerged outlet, a plunger, means for moving said plunger laterally into and out of a position over the outlet, a shield arranged at one side of the plunger and moving laterally therewith, and means to reciprocate the plunger vertically when over the outlet.

13. The combination of a container for molten glass having a submerged outlet, a vertically reciprocating plunger, a shield beside the plunger and held stationary during said vertical reciprocation of the plunger, and means to move the plunger and shield laterally.

14. In glass forming apparatus, the combination with a container for molten glass having a submerged outlet, of a plurality of plungers projecting into the glass in the container, means for revolving the plungers about a vertical axis at one side of the outlet, the plungers being arranged to be brought by such revolution in succession to an operating position over the outlet, and shields interposed between the plungers and rotating therewith about said axis.

15. In glass forming apparatus, the combination with a container for molten glass having a submerged outlet, of a plurality of plungers projecting into the glass in the container, means for revolving the plungers about a vertical axis at one side of the outlet, the plungers being arranged to be brought by such revolution in succession to an operating position over the outlet, and a cylindrical member comprising horizontally spaced walls, said plungers being arranged in the spaces between said walls.

16. The combination of a container for molten glass having a submerged outlet, a plurality of plungers and shields arranged in alternation in an annular series, means for rotating said series about a vertical axis at one side of the outlet and thereby bringing the plungers in succession to an operative position over the outlet, and means to reciprocate each plunger when over the outlet.

17. The combination of a container for molten glass having a submerged outlet, a plurality of plungers and shields arranged in alternation in an annular series, means to impart a step-by-step rotation to said series about a vertical axis and thereby bring the plungers in succession to an operative position over the outlet, and means to reciprocate each plunger vertically when over the outlet.

18. In glass feeding apparatus, the combination of a container for molten glass having a submerged outlet, an implement projecting into the glass in the container, automatic means for intermittently moving said implement in a circular path about a vertical axis at one side of the outlet and thereby periodically moving the implement into and out of an operative position over the outlet, a shield extending into the glass at one side of the implement and movable with the implement in said circular path to thereby relieve the strain on the implement as it moves through the glass, and means for actuating the implement when over the outlet.

19. The combination of a container for molten glass having a submerged outlet, a plurality of implements and shields arranged in alternation in an annular series, means for rotating said series about a vertical axis at one side of the outlet and thereby bringing the implements in succession to an operative position over the outlet, and means for actuating each said implement when over the outlet to control the discharge of glass through the outlet.

20. Apparatus for delivering charges of molten glass in succession comprising a container for the glass having a bottom outlet, a plurality of implements, automatic means for causing a series of cycles of movements of said implements, each of said cycles including the bringing of the several implements in succession into operative position over the outlet, and means for operating each implement while in said position.

21. Apparatus for delivering charges of molten glass in succession comprising a container for the glass having a bottom outlet, a plurality of plungers, automatic means for causing a series of cycles of movements of said plungers, each of said cycles including the bringing of the several plungers in succession into operative position over the outlet, and means for reciprocating each plunger while in said position.

Signed at Toledo, in the county of Lucas and State of Ohio, this 14th day of October, 1927.

JOHN F. RULE.